Figure 1:
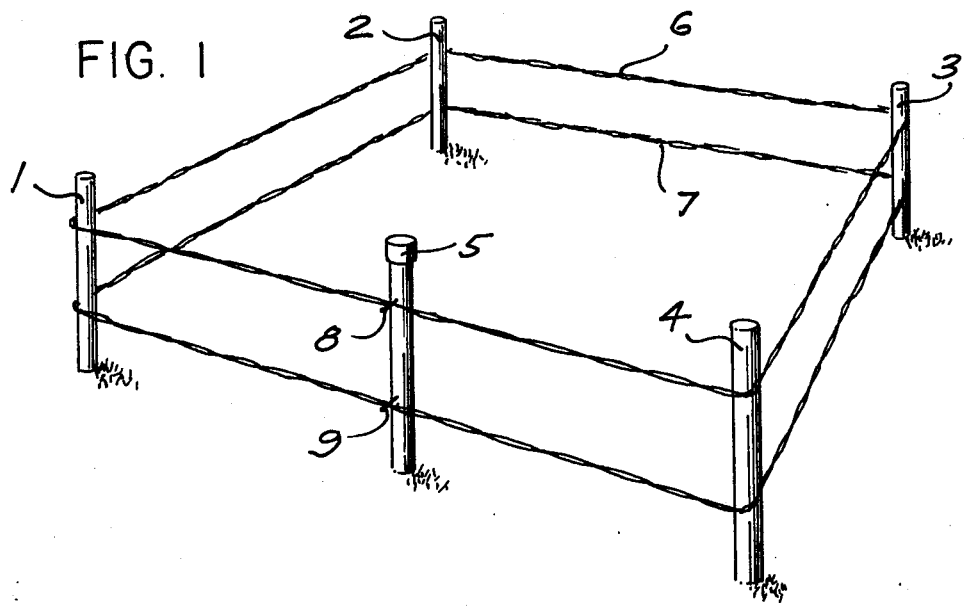

United States Patent [19]
Enoksson

[11] 3,980,277
[45] Sept. 14, 1976

[54] DEVICE FOR FENCE CONSISTING OF A NUMBER OF POSTS WITH ELECTRICALLY CONDUCTING CONDUCTORS AND A HIGH TENSION UNIT

[75] Inventor: Bertil Petrus Enoksson, Gyttorp, Sweden

[73] Assignee: Nitro-Nobel A.B., Gyttorp, Sweden

[22] Filed: Oct. 21, 1974

[21] Appl. No.: 516,666

Related U.S. Application Data

[63] Continuation of Ser. No. 343,481, March 21, 1973, abandoned.

[30] Foreign Application Priority Data

Apr. 14, 1972 Sweden.............................. 4863/72

[52] U.S. Cl. .............................. 256/10; 174/158 F; 256/1; 317/262 S
[51] Int. Cl.²............................................ A01K 3/00
[58] Field of Search.............. 256/10, 1; 174/110 R, 174/119 R, 119 C, 129 B, 131 B, 133 R, 133 B, 158 P, 161 P; 317/262

[56] References Cited
UNITED STATES PATENTS

| | | | |
|---|---|---|---|
| 348,008 | 8/1886 | Harris | 174/119 R |
| 453,326 | 6/1891 | Ide | 174/110 R X |
| 1,136,384 | 4/1915 | Weissmann | 174/129 B |
| 2,267,455 | 12/1941 | Gerhard | 256/10 UX |
| 3,223,796 | 12/1965 | Willoughby | 256/10 X |
| 3,286,018 | 11/1966 | McLoughlin | 174/133 R X |
| 3,366,854 | 1/1968 | Robinson | 256/10 X |
| 3,413,405 | 11/1968 | Myers | 174/110 R X |

FOREIGN PATENTS OR APPLICATIONS

44-18263   1/1965   Japan .............................. 174/133 B

*Primary Examiner*—Dennis L. Taylor
*Attorney, Agent, or Firm*—Hane, Baxley & Spiecens

[57] ABSTRACT

There is disclosed an electrified fence for blocking the passage of animals. This fence comprises a plurality of posts, at least one of which includes a power supply. One or more conductor wires are connected to the power supply and strung from post to post. Each of these conductor wires consists of a metal ribbon coated on both sides with insulation material but leaving exposed the lengthwise edges of the ribbon.

4 Claims, 2 Drawing Figures

DEVICE FOR FENCE CONSISTING OF A NUMBER OF POSTS WITH ELECTRICALLY CONDUCTING CONDUCTORS AND A HIGH TENSION UNIT

This is a continuation of application Ser. No. 343,481, filed Mar. 21, 1973 now abandoned.

The present invention relates to a device for a fence, particularly for enclosing animals or for preventing the passage of animals, consisting of a number of posts connected together with each other with one or several electric conductors connected to a high voltage unit, so that animals coming into contact with the wire receive an electric shock. Fences of this kind have been known for a long time. For such fences, the wires between the individual posts are usually metal wires with a circular cross-section. Said wires are charged in relation to ground by a high tension unit. However, such a fence has the drawback that it is difficult for the animals to discern, and the animals can therefore run against the fence so that it will break.

The purpose of the present invention is to provide a fence which is easily observed by animals, and which does not easily become grounded by vegetation growing up near it. According to the invention, the fence consists of a metal strip, the flat surfaces of which are coated with an electrically insulating layer, so that only the edge surfaces of the flat surfaces will be uncoated. The insulating layers are moreover chosen in such a way that the strength of the metal strip is increased in relation to that of the metal strip without the coating.

The metal strip is appropriately of aluminum, and the layers usually consist of plastics material of the same or of different kinds. Conceivable plastics are polyester, polyethylene and polyvinyl chloride.

The metal strip between two posts is usually turned or twisted around its longitudinal axis, so that the edge surfaces of the strip have a more or less screw-like form, in order to ensure that contact is made with the body of an animal.

The coatings on the metal strips can have different colors, depending on what kinds of animals are to be enclosed. The color can either be frightening, so that an animal, on seeing the strip turns away from it, or else the color can be such that the animal will be curious about the strip, and because of its curiousness it receives an electric shock, and in that way learns that it cannot go too near the metal strip.

Characteristic properties of the present invention will be noted from the following claims.

Figure 2:
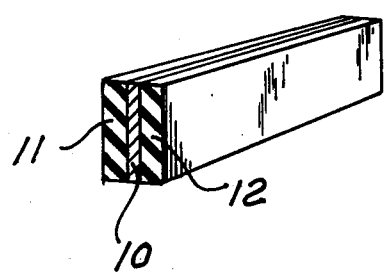

The present invention will be described in more detail with reference to the attached drawing, in which FIG. 1 shows a fence according to the present invention, and FIG. 2 shows a metal strip comprised in the fence according to FIG. 1.

In FIG. 1, the reference designations 1, 2, 3, 4 and 5 refer to posts anchored in the ground, of which the post 5 contains a high voltage unit provided with connection wires 8 and 9 to the fence conductors 6 and 7. Each of the fence conductors consist of a flat pliable metal strip or ribbon 10, appropriately of aluminum. An appropriate thickness of the metal strip is 12 $\mu$m. The upper and lower sides of the strip are coated with pliable plastic layers 11 and 12, which can have varying thicknesses up to 200 $\mu$m. Thicknesses of 50 and 100 $\mu$m can also be used. Said plastic layer can consist of a polyester, of polyethylene or of polyvinyl chloride. The thickness of the plastic layers is determined by the tensile stresses to which the strip may be subjected. Due to the coating of the metal strip, this will not break when subjected to a pulling force until the plastic layer breaks, so that the tensile strength of the strip is increased. As will be clearly noted from FIG. 2, the two plastic layers 11 and 12 have the same width as the strip 10, so that the strip 10 is unprotected electrically only at the two edge surfaces. The two layers can be of the same or of different plastic.

When setting up a fence according to the present invention, the five posts 1–5 are anchored, after which the electric conductors 6 and 7 are fastened to the posts. The fastening device at the post 5 appropriately consists of an eyebolt. One end of the strip is appropriately pulled through the eye, so that the strip itself at the fastening point forms an eye. On two adjacent parts, a tubular or sleeve-like plastic part is placed, which keeps the end of the strip secured to the post 5. Thereafter the strip is turned around its longitudinal axis, so that it becomes twisted. Thereafter the strip is fastened to the nearest adjacent post, for instance by allowing the strip to form an eye which is laid around the post 5 allowing a tubular part of the previously mentioned kind through which two parts of the strip pass and from where the eye originates to determine the size of the eye. Between said two posts, the strip thus has the character of a screwed line. The same procedure is applied for the connection to the other posts and, finally, the other end of the strip is fastened to the post 5 with the high voltage unit. The strip is thus twisted between all of the posts. By arranging a fence in the present way, an electric conductor with a very small contact surface for growing vegetation is obtained, thereby reducing the risk for contact being made through the vegetation. Due to the fact that the strip is twisted, it is adequately ensured that the body of an animal which touches the fence will obtain a conducting contact with the uninsulated surfaces, and due to the fact that the metal strip can be coated with different colours, the animal will either become afraid of the strip or have its curiosity aroused.

The fence need not form an enclosure, but can also be arranged to form a barrier, particularly for wild animals.

I claim:

1. An electrified fence for blocking the passage of earth bound animals, said fence comprising a plurality of posts and at least one electric conductor adapted to be connected to a voltage source and strung from post to post, said conductor including a single flat metal ribbon or rectangular cross-section and two layers of pliable insulation material, each of said layers fully coating one of the opposite face sides of said ribbon thereby sandwiching the metal ribbon between the insulation layers, said layers defining therebetween a continuous and uninterrupted strip of metal along the length of both edges of the conductor.

2. The electrified fence according to claim 1 wherein said insulation material is a pliable synthetic plastics material.

3. The electrified fence according to claim 1 wherein the thickness of each of said coatings is larger than the thickness of the metal ribbon.

4. The electrified fence according to claim 1 wherein said conductor is helically twisted about its lengthwise axis.

* * * * *